US012521576B2

(12) United States Patent
Li et al.

(10) Patent No.: US 12,521,576 B2
(45) Date of Patent: Jan. 13, 2026

(54) ULTRASONIC THERAPEUTIC SYSTEM, METHOD FOR CONTROLLING ULTRASONIC THERAPEUTIC SYSTEM AND ULTRASONIC THERAPEUTIC APPARATUS

(71) Applicant: SHENZHEN PENINSULA MEDICAL GROUP, Shenzhen (CN)

(72) Inventors: Yanan Li, Shenzhen (CN); Xiaobing Lei, Shenzhen (CN); Xingli Li, Shenzhen (CN); Yujia Peng, Shenzhen (CN)

(73) Assignee: SHENZHEN PENINSULA MEDICAL GROUP, Shenzhen (CN)

( * ) Notice: Subject to any disclaimer, the term of this patent is extended or adjusted under 35 U.S.C. 154(b) by 0 days.

(21) Appl. No.: 18/778,047

(22) Filed: Jul. 19, 2024

(65) Prior Publication Data
US 2024/0366970 A1 Nov. 7, 2024

Related U.S. Application Data

(63) Continuation of application No. PCT/CN2022/134881, filed on Nov. 29, 2022.

(30) Foreign Application Priority Data

Jun. 6, 2022 (CN) .......................... 202210627804.9

(51) Int. Cl.
A61N 7/02 (2006.01)
A61N 7/00 (2006.01)

(52) U.S. Cl.
CPC ........ *A61N 7/02* (2013.01); *A61N 2007/0008* (2013.01); *A61N 2007/0034* (2013.01); *A61N 2007/027* (2013.01)

(58) Field of Classification Search
None
See application file for complete search history.

(56) References Cited

U.S. PATENT DOCUMENTS

2006/0074313 A1    4/2006  Slayton et al.
2010/0324423 A1* 12/2010  El-Aklouk ........... A61B 8/4488
                                                    600/444
(Continued)

FOREIGN PATENT DOCUMENTS

CN     202128822 U    2/2012
CN     103028203 A    4/2013
(Continued)

OTHER PUBLICATIONS

First Office Action issued in counterpart Chinese Patent Application No. 202210627804.9, dated Dec. 5, 2022.
(Continued)

*Primary Examiner* — Yi-Shan Yang
(74) *Attorney, Agent, or Firm* — Westbridge IP LLC

(57) ABSTRACT

Disclosed are an ultrasonic therapeutic system, a control method thereof and an ultrasonic therapeutic apparatus, and relates to the field of ultrasonic therapy. The ultrasonic therapeutic system includes a linear-type handpiece and a point-type handpiece, and the control method includes the following steps: controlling at least one of a linear-type handpiece and a point-type handpiece to apply ultrasonic energy inside a treatment area; the linear-type handpiece is configured to apply multiple focuses of the ultrasonic energy in line at one shot, being capable of discretely moving at a preset interval along a skin surface of the treatment area; and the point-type handpiece is configured to apply one focus of the ultrasonic energy at one shot, being capable of continuously sliding and overlapping for a preset time along the skin surface of the treatment area.

15 Claims, 4 Drawing Sheets

(56) References Cited

U.S. PATENT DOCUMENTS

| | | | |
|---|---|---|---|
| 2012/0016239 A1 | 1/2012 | Barthe et al. | |
| 2019/0357976 A1* | 11/2019 | Youngquist | A61N 5/0616 |
| 2022/0023671 A1* | 1/2022 | Barthe | A61B 8/0858 |
| 2022/0266063 A1* | 8/2022 | Emery | A61B 8/4477 |

FOREIGN PATENT DOCUMENTS

| | | |
|---|---|---|
| CN | 104383646 A | 3/2015 |
| CN | 104645511 A | 5/2015 |
| CN | 106470735 A | 3/2017 |
| CN | 107684671 A | 2/2018 |
| CN | 109350870 A | 2/2019 |
| CN | 111511285 A | 8/2020 |
| CN | 113181570 A | 7/2021 |
| CN | 114984469 A | 9/2022 |

OTHER PUBLICATIONS

International Search Report and Written Opinion issued in corresponding PCT Application No. PCT/CN2022/134881, dated Feb. 16, 2023.
Refusal Decision issued in counterpart Chinese Patent Application No. 202210627804.9, dated Jun. 1, 2023.
Second Office Action issued in counterpart Chinese Patent Application No. 202210627804.9, dated Mar. 4, 2023.

\* cited by examiner controlling at least one of the linear-type handpiece and the point-type handpiece to output the ultrasonic energy with an adjusted ultrasonic power, an adjusted number of shots and/or an adjusted operation time based on detected temperature data of the treatment area, detected acoustic impedance data of the treatment area, or a detected movement speed of the handpiece — S122

FIG. 9

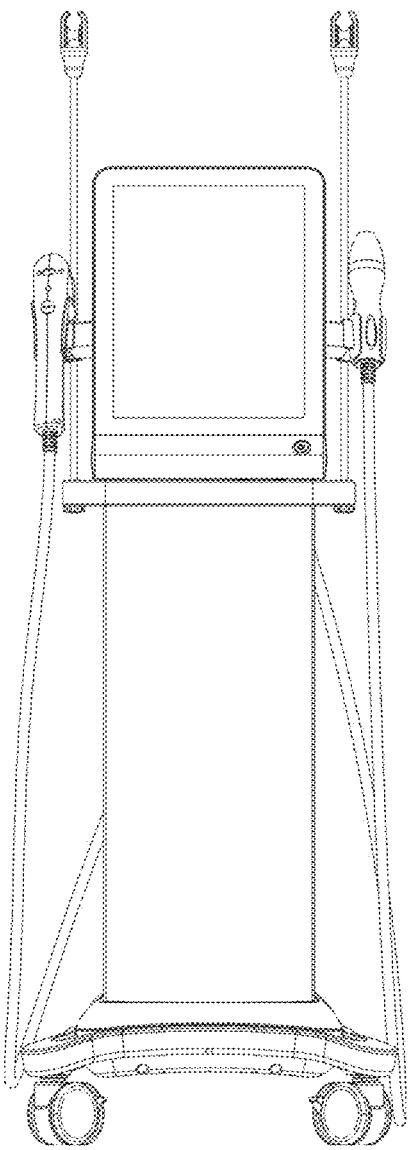

FIG. 10

ULTRASONIC THERAPEUTIC SYSTEM, METHOD FOR CONTROLLING ULTRASONIC THERAPEUTIC SYSTEM AND ULTRASONIC THERAPEUTIC APPARATUS

CROSS-REFERENCE TO RELATED APPLICATIONS

This application is a continuation application of International Application No. PCT/CN2022/134881, filed on Nov. 29, 2022, which claims priority to Chinese Patent Application No. 202210627804.9, filed on Jun. 6, 2022. The disclosures of the above-mentioned applications are incorporated herein by reference in their entireties.

TECHNICAL FIELD

The present application relates to the field of ultrasonic therapy, and in particular to an ultrasonic treatment system, a method for controlling the ultrasonic treatment system, and an ultrasonic treatment apparatus.

BACKGROUND

Ultrasonic therapy is a common treatment method that achieves therapeutic effects by outputting ultrasonic energy to subcutaneous tissue, which has the effects of beauty care, weight loss, wrinkle reduction, facelift and wrinkle removal.

During the process of ultrasonic therapy, ultrasonic energy acts on subcutaneous tissue through the skin. During the operation, it is necessary to constantly change positions of the outputted ultrasonic energy. By enlarging diffuse area of the outputted ultrasonic energy the therapeutic effect is achieved. Ultrasonic therapy on the market is usually treated by using ultrasonic scalpels, and ultrasonic scalpels are mostly used to quickly treat large areas of skin with lines and surfaces. In this way, missed areas are existed and also there are restricted areas on the skin for operation; it is impossible to completely cover all areas for treatment.

SUMMARY

The main purpose of the present application is to provide an ultrasonic treatment system and method for controlling the ultrasonic treatment system, and an ultrasonic treatment apparatus, which aims to improve the coverage integrity of the treatment area of the ultrasound treatment system.

In order to achieve the above purpose, the method for controlling the ultrasonic treatment system includes the following steps:
 controlling at least one of a linear-type handpiece and a point-type handpiece to apply ultrasonic energy inside a treatment area;
 the linear-type handpiece is configured to apply multiple focuses of ultrasonic energy in line at one shot, being capable of discretely moving at a preset interval along a skin surface of the treatment area; and the point-type handpiece is configured to apply one focus of ultrasonic energy at the one shot, being capable of sliding continuously for a preset time along the skin surface of the treatment area to move a position of the one focus inside the treatment area.

In an embodiment, before the controlling at least one of the linear-type handpiece and the point-type handpiece to apply the ultrasonic energy inside the treatment area, the method further includes:
 obtaining and displaying skin tissue information of the treatment area; and
 classifying the treatment area based on the skin tissue information; the treatment area includes one or more of a forehead, a cheek, a mandible, a periocular region, a neck, and an abdomen.

In an embodiment, the method for controlling the ultrasonic treatment system further includes:
 controlling the linear-type handpiece firstly and then controlling the point-type handpiece to apply the focuses of the ultrasonic energy at a same depth.

In an embodiment, the method for controlling the ultrasonic treatment system further includes:
 controlling the point-type handpiece firstly and then controlling the linear-type handpiece to apply the focuses of the ultrasonic energy at a same depth.

In an embodiment, the method for controlling the ultrasonic treatment system further includes:
 controlling at least one of the linear-type handpiece and the point-type handpiece to apply the focuses of the ultrasonic energy at different depths.

In an embodiment, the method for controlling the ultrasonic treatment system, the step of controlling at least one of the linear-type handpiece and the point-type handpiece to apply the focuses of the ultrasonic energy at different depths, comprises:
 controlling at least one of the linear-type handpiece and the point-type handpiece to apply the focuses of the ultrasonic energy continuously or discretely changed from shallow to deep, or from deep to shallow under the skin surface.

In an embodiment, the method for controlling the ultrasonic treatment system specifically includes:
 in response to a selected first focus depth, controlling the linear-type handpiece to discretely move at the preset interval such that applying the focuses of the ultrasonic energy at the first focus depth firstly, and then controlling the point-type handpiece to slide continuously for the preset time to move the position of the one focus at the first focus depth; and
 in response to a selected second focus depth, controlling the linear-type handpiece to discretely move at the preset interval such that applying the focuses of the ultrasonic energy at the second focus depth firstly, and then controlling the point-type handpiece to slide continuously for the preset time to move the position of the one focus at the second focus depth.

In an embodiment, in response to that the first focus depth is greater than the second focus depth, the sequence of controlling the handpieces includes:
 controlling the linear-type handpiece to discretely move at the preset interval to apply the focuses of the ultrasonic energy at the first focus depth;
 controlling the point-type handpiece to slide continuously for the preset time to move the position of the one focus at the first focus depth;
 controlling the linear-type handpiece to discretely move at the preset interval to apply the focuses of the ultrasonic energy at the second focus depth; and
 controlling the point-type handpiece to slide continuously for the preset time to move the position of the one focus at the second focus depth.

In an embodiment, in response to that the first focus depth is greater than the second focus depth, the sequence of controlling the handpieces includes:

controlling the linear-type handpiece to discretely move at the preset interval to apply the focuses of the ultrasonic energy at the second focus depth;

controlling the point-type handpiece to slide continuously for the preset time to move the position of the one focus at the second focus depth;

controlling the linear-type handpiece to discretely move at the preset interval to apply the focuses of the ultrasonic energy at the first focus depth; and controlling the point-type handpiece to slide continuously for the preset time to move the position of the one focus at the first focus depth.

In an embodiment, the controlling at least one of the linear-type handpiece and the point-type handpiece to apply the ultrasonic energy inside the treatment area further includes:

detecting whether at least one of a treatment surface of the linear-type handpiece and a treatment surface of the point-type handpiece is in contact with the skin surface of the treatment area; and in response to that at least one of the treatment surface of the linear-type handpiece and the treatment surface of the point-type handpiece and the skin surface of the treatment area are in contact, controlling the handpiece to emit the ultrasonic energy; in response to that at least one of the treatment surface of the linear-type handpiece and the treatment surface of the point-type handpiece and the skin surface of the treatment area are not in contact, controlling the handpiece to stop emitting the ultrasonic energy.

In an embodiment, based on skin information of the treatment area, the controlling at least one of the linear-type handpiece and the point-type handpiece to apply the ultrasonic energy inside further includes:

controlling at least one of the linear-type handpiece and the point-type handpiece to emit the ultrasonic energy with different ultrasonic powers, different numbers of shots and/or different operation times according to different treatment areas.

In an embodiment, the controlling at least one of the linear-type handpiece and the point-type handpiece to emit the ultrasonic energy with different ultrasonic powers, different numbers of shots and/or different operation times according to different treatment areas further includes:

controlling at least one of the linear-type handpiece and the point-type handpiece to output the ultrasonic energy with an adjusted ultrasonic power, an adjusted number of shots and/or an adjusted operation time based on detected temperature data of the treatment area, detected acoustic impedance data of the treatment area, or a detected movement speed of the handpiece.

The present application also proposes an ultrasonic treatment system, the ultrasonic treatment system includes:

a controller;

a memory, storing a control program of the ultrasonic treatment system, when the control program is executed by the controller, the method for controlling the ultrasonic treatment system as described above is implemented;

a linear-type handpiece, configured to apply multiple focuses of ultrasonic energy in line at one shot, being capable of discretely moving at a preset interval along a skin surface of the treatment area; and a point-type handpiece, configured to apply one focus of ultrasonic energy at one shot, being capable of sliding continuously for a preset time along the skin surface of the treatment area to move a position of the one focus inside the treatment area.

In an embodiment, the ultrasonic treatment system further includes multiple ultrasonic therapy tips detachably mounted on the linear-type handpiece and the point-type handpiece respectively correspondingly, such that the linear-type handpiece and the point-type handpiece are capable of applying the focuses of the ultrasonic energy discretely generated by the ultrasonic therapy tips at multiple depths.

In an embodiment, each of the linear-type handpiece and the point-type handpiece include a transducer and a moving mechanism, the moving mechanism is configured to drive the transducer to move, such that the linear-type handpiece and the point-type handpiece are capable of applying the focuses of the ultrasonic energy generated by the movable transducer at multiple depths.

In an embodiment, the linear-type handpiece and the point-type handpiece each further includes a detection sensor configured for detecting contact statuses between the treatment surface of the linear-type handpiece or the point-type handpiece and a skin surface; and the detection sensor includes at least one of a pressure sensor, a capacitive sensor and a light sensor.

In an embodiment, the ultrasonic treatment system further includes:

a user interface configured for displaying skin information of the treatment area, receiving an individual mode or a combination mode of the linear-type handpiece and the point-type handpiece inputted by an user, and/or a treatment depth information, and sending acquired combination mode information of the linear-type handpiece and the point-type handpiece, and/or the treatment depth information to the controller.

The present application also proposes an ultrasonic treatment apparatus, including the ultrasonic treatment system as described above.

The technical solution of the present application applies ultrasonic energy inside the treatment area by controlling at least one of the linear-type handpiece and the point-type handpiece to discretely move or continuously slide along the skin surface to perform comprehensive ultrasonic coverage treatment. The linear-type handpiece is configured to discretely move at the preset interval along the skin to apply ultrasonic energy inside the skin, and the point-type handpiece is configured to slide continuously for the preset time to move the position of the one focus. Specifically, the multiple energy focuses outputted by a linear-type handpiece in a single shot are arranged in a straight line, and in a mode of discretely moving along the skin surface at a preset interval, compared with the point-type handpiece, a relatively large skin area can be treated; when the ultrasonic energy is transferred, the treatment spots may be formed in a spiral-circle path via the point-type handpiece in a mode of sliding continuously in the spiral-circle path along the skin, here the treatment spot refers to at least one heat-diffusing areas where the tissue is denatured by the transferred energy, so as to realize comprehensive ultrasonic energy treatment under the skin. By using a linear-type handpiece and a point-type handpiece to emit ultrasonic energy individually or in combination in sequence in a variety of control methods, thereby improving the completeness of the ultrasonic treatment system's coverage of the treatment area, improving the distribution uniformity of the ultrasonic energy in the treatment area, finally improving the treatment effect.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

FIG. 9 is a flow chart of a method for controlling an ultrasonic treatment system according to another embodiment of the present application.

FIG. 10 is a structural schematic view of an ultrasonic treatment system according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in the present application, all other embodiments obtained by those skilled in the art without making creative labor fall within the scope of the present application.

It should be noted that if there are directional instructions (such as up, down, left, right, front, back or the like) involved in the embodiments of the present application, the directional indications are only used to explain the relative positional relationship, movement and so on between various components in a specific posture (as shown in the accompanying drawings). If the specific posture changes, the directional indication will also change accordingly.

In addition, in the embodiment of the present application, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the meaning of "and/or" appearing in the entire text includes three parallel solutions, taking "A and/or B" as an example, it includes solution A, or solution B, or a solution that satisfies both A and B at the same time. In addition, the technical solutions of various embodiments can be combined with each other, but it is based on that those of ordinary skill in the art can realize. When the combination of technical solutions is contradictory or cannot be realized, it should be considered that such combination of technical solutions does not exist and is not within the protection scope claimed by the present application.

Figure 1:
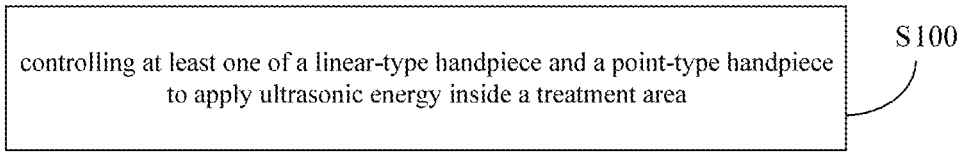
FIG. 1 is a flow chart of a method for controlling an ultrasonic treatment system according to an embodiment of the present application.

The present application provides a method for controlling an ultrasonic treatment system, which is applied to an ultrasonic treatment system. Referring to FIG. 1 and FIG. 9, in an embodiment of the present application, the method for controlling the ultrasonic treatment system includes the following steps:

Step S100: controlling at least one of a linear-type handpiece and a point-type handpiece to apply ultrasonic energy inside a treatment area.

The linear-type handpiece is configured to apply multiple focuses of ultrasonic energy in line at one shot, being capable of discretely moving at a preset interval along a skin surface of the treatment area; and the point-type handpiece is configured to apply one focus of ultrasonic energy at one shot, being capable of sliding continuously for a preset time along the skin surface of the treatment area to move a position of the one focus inside the treatment area. It can be understood that the focused ultrasound range of one shot of the linear-type handpiece is greater than the focused ultrasound range of one shot of the point-type handpiece. Specifically, the preset interval of the discrete movement has a distance range of 0.5 mm to 2 mm, and the preset time of the continuous sliding has a time range of 1 min to 5 min.

It should be noted that in a working mode, the linear-type handpiece applies multiple focuses of the ultrasonic energy inside the treatment area in one shot, and the focuses are arranged in a straight line. Therefore, it is necessary to control the linear-type handpiece to perform the operations of discrete movement along the skin surface in the treatment area, that is, to make the move operations of pick-up and put-down repeatedly on the skin surface, so as to present the treatment spots in multiple linear paths with discrete intervals, here the treatment spot refers to at least one heat-diffusing areas where the tissue is denatured by the transferred energy. The discrete intervals can also be adjusted according to the actual conditions such as the different skin of the treatment area, the treatment needs, and so on. The working mode of the point-type handpiece is to output a single ultrasonic energy focal point in one shot and diffuse the heat around it in a circular arrangement. Therefore, it is necessary to control the point-type handpiece to perform continuous sliding along the skin surface in the treatment area. In an embodiment, the point-type handpiece can be driven to slide in a spiral-circle path to achieve a small-scale treatment operation. The sliding continuous time can be selected from a preset time, and the appropriate preset time can effectively ensure the treatment effect of the treatment area. The preset time can also be adjusted according to the actual conditions such as the different skin in the treatment area and the treatment needs. For example, part of the treatment area requires intensive treatment, thus, the treatment time can be appropriately extended. It can be understood that the number of the ultrasonic energy focuses of a single-shot emission of the linear-type handpiece is greater than the number of the ultrasonic energy focuses of a single-shot emission of the point-type handpiece, and the ultrasonic energy focuses generated via the linear-type handpiece during one single shot are arranged in a line path, while the ultrasonic energy focuses generated by the point-type handpiece are arranged in a spiral-circle path with diffusing heat around it. Therefore, in the one single shot, the focused ultrasonic range of the linear-type handpiece is greater than the focused ultrasonic range of the point-type handpiece.

For example, aiming at the skin tissue of the relatively flat treatment area, the ultrasonic treatment system controls the linear-type handpiece to emit the ultrasonic energy, by discretely moving at the preset interval, due to its working characteristics, which produces multiple focuses arranged in line during one shot, thus achieving the technical effect of rapid treatment of a large area. For the treatment area that requires a small treatment area, the ultrasonic treatment system controls the point-type handpiece to emit the ultrasonic energy, and by continuously sliding for the preset time, due to its working characteristics, the point-type handpiece produces the ultrasonic focuses in a spiral-circle path with diffusing heat around it, thereby achieving the ultrasonic treatment for a small-scale area on the skin surface. In addition, the point-type handpiece can also treat uneven skin tissue due to its working characteristics. Therefore, in practical applications, the treatment area may require the ultrasonic treatment system to control the linear-type handpiece and the point-type handpiece to work in combination in sequence, so as to realize comprehensive ultrasonic energy treatment under the skin. By using a linear-type handpiece and a point-type handpiece to emit ultrasonic energy individually or in combination in sequence in a variety of control methods, thereby improving the completeness of the ultrasonic treatment system's coverage of the treatment area, improving the distribution uniformity of the ultrasonic energy in the treatment area, finally improving the treatment effect.

In an embodiment, the control method also includes:
controlling at least one of the linear-type handpiece and the point-type handpiece to apply the focuses of the ultrasonic energy at different depths In this embodiment, whether it is the linear-type handpiece or the point-type handpiece, the ultrasonic energy emitted by the handpiece will produce different treatment effects on skin tissues at different skin depths. Acting on the Superficial Musculo-Aponeurotic System (SMAS) fascia layer, the fascia can be immediately contracted, the suspension function of the ligament fascia can be enhanced, and the sagging skin can be significantly lifted and tightened. Acting on the superficial fascia layer, the fat fiber septum can be immediately contracted, the fat can be compacted, and the aging problem caused by fat accumulation and sagging can be improved. Acting on the dermis layer, the elastic fibers of the skin tissue can be immediately contracted, the skin can be tightened, and the immediate firming effect can be enhanced. 2.0 mm below the skin is the dermis layer; 3.0 mm below the skin is the superficial fascia layer; 4.5 mm below the skin is the SMAS fascia layer. The ultrasonic treatment system can control at least one of the linear-type handpiece and the point-type handpiece to emit the ultrasonic energy to multiple focus depths at different depths. It can be understood that the method of emitting the multiple ultrasonic focuses at different depths along the longitudinal depth direction underneath the skin includes the method of driving the transducer in the handpiece to mechanically move to realize continuous emission of ultrasonic energy. Or the method of replacing multiple ultrasonic tips with multiple different ultrasonic focus depths to realize discrete emission of ultrasonic energy at different depths. For example, the ultrasonic treatment system includes multiple ultrasonic tips with different focus depths, which can control after at least one of the linear-type handpiece and the point-type handpiece finishes the work at the SMAS fascia layer, and then control the handpiece with another replaced ultrasonic tip to work at the superficial fascia layer, and after the work is finished, further control the handpiece with a next replaced tip with a third focus depth to work at the dermis layer, therefore at least one of the linear-type handpiece and the point-type handpiece can emit ultrasonic energy to multiple different focus depths, thereby achieving a multi-level treatment effect on the treatment area of skin in the target position. The method of the ultrasonic treatment system to achieve continuous emission of ultrasonic energy to multiple focus depths at different depths, by driving the mechanical movement of the transducer in the handpiece is also included in this embodiment, which will not be repeated here.

Certainly, this embodiment also includes that during the treatment of each focus depth under the skin surface, the ultrasonic treatment system can control the combination mode or individual mode of the linear-type handpiece and the point-type handpiece to work in sequence. As described in the above embodiment, in the combination mode, for each focus depthunder the skin surface, the effect of full coverage of ultrasonic therapy treatment is achieved.

In an embodiment, the control method also includes:
controlling at least one of the linear-type handpiece and the point-type handpiece to apply the focuses of the ultrasonic energy continuously or discretely changed from shallow to deep, or from deep to shallow under the skin surface.

In this embodiment, the ultrasonic treatment system can control at least one of the linear-type handpiece and the point-type handpiece to emit the ultrasonic energy to multiple focus depths from shallow to deep, or from deep to shallow in sequence, in which the focus depths are generated continuously or discretely. It can be understood that the method of emitting multiple focus depths along the longitudinal depth direction under the skin includes two ways: one way is driving the transducer in the handpiece to mechanically move to realize continuously applying the multiple ultrasound focuses from shallow to deep inside the treatment area; or the other way is replacing multiple ultrasonic tips with multiple different focus depths to realize discrete applying the multiple ultrasound focuses from shallow to deep inside the treatment area. For example, by mounting multiple ultrasonic tips with different focus depths in the ultrasonic treatment system, can control at least one of the linear-type handpiece and the point-type handpiece to transfer the ultrasonic energy to the dermis layer. The ultrasonic treatment system can control that after at least one of the linear-type handpiece and the point-type handpiece finishes the work at the dermis layer, and then control the handpiece with a next replaceable ultrasonic tip to work at the superficial fascia layer, and after the work is finished, further control the handpiece with another replaceable ultrasonic tip of another focus depth to work at the SMAS fascia layer, so that achieving that at least one of the linear-type handpiece and the point-type handpiece emit the ultrasound wave to multiple focus depths from shallow to deep in sequence. The method of the ultrasonic treatment system to achieve continuous emission of the ultrasound wave to multiple focus depths from deep to shallow by driving the transducer to continuously move inside the handpiece, is also included in this embodiment, which will not be repeated here.

Certainly, this embodiment also includes that during the treatment of each layer of focus depth of skin tissue, the ultrasonic treatment system can control the combination mode or individual mode of the linear-type handpiece and the point-type handpiece to work in sequence. As described in the above embodiment, in the combination mode, for each layer at each focus depth of ultrasonic therapy, the effect of full coverage of ultrasonic therapy is achieved.

Figure 2:
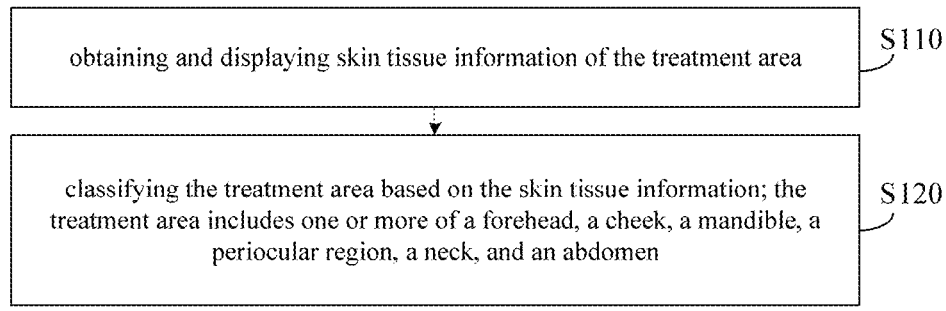
FIG. 2 is a flow chart of a method for controlling an ultrasonic treatment system according to another embodiment of the present application.

Referring to FIG. 2, furthermore, before the controlling at least one of the linear-type handpiece and the point-type handpiece to apply the ultrasonic energy inside the treatment area, the method further includes:

Step S110: obtaining and displaying skin tissue information of the treatment area.

Step S120: classifying the treatment area based on the skin tissue information; the treatment area includes one or more of a forehead, a cheek, a mandible, a periocular region, a neck, and an abdomen.

In this embodiment, obtaining the skin tissue information can use the ultrasonic treatment system to obtain the input signal and then display on the user interaction interface. The input signal of the user interaction interface can be the image information of the target skin position, or it can be the information manually inputted by users. Specifically, the ultrasonic treatment system imports the image information and displays the obtained skin tissue information of the target position on the user interaction interface. The controller in the ultrasonic treatment system divides the skin tissue information of the target position into different treatment areas based on the pre-stored information in the memory, and displays the treatment plan. Specifically, the treatment area includes but is not limited to the forehead, cheek, mandible, periocular region, neck, abdomen and other areas. Based on the characteristics of ultrasonic therapy at different skin positions of the human body, each treatment area can be further divided into one or more of the normal area, nerve sensitive area, sunken area and ligament strengthening area. In order to ensure that the image information is matched and recognized by the ultrasonic treatment system, it is necessary to further standardize the input image information. Taking the user's facial skin as an example to illustrate. Specifically, before the treatment, a camera is used to take photos of the patient's face in the upright position, left lateral position and right lateral position under the same light source and the same background, causing the lens plane to be parallel to the target area, and the shooting distance and height are fixed accurately. In this way, taking photos of the front face, photos of 45° on the left lateral face, photos of 45° on the right lateral face, photos of 90° on the left lateral face, photos of 90° on the right lateral face respectively. The frontal image is: observing from the viewfinder, causing the highest point of the outer ear helix and the outer canthus of the eye to be on the horizontal line of the center of the viewfinder, and the vertical line of the center passes through the midline of the face; the auricles on both sides are equally exposed, and the patient is asked to look at the lens with both eyes. The 45° semi-lateral image is: the horizontal line of the center of the viewfinder passes through the highest point of the outer ear helix and the outer canthus of the eye; when the upper lip and lower lip are naturally closed, the contour of the upper lip edge is tangent to the contour of the opposite cheek. The 90° lateral image is: the horizontal line of the center of the viewfinder passes through the highest point of the outer ear helix and the outer canthus of the eye; when the upper lip and lower lip are naturally closed, the tip of the nose and the tip of the chin are in the same straight line. If the ultrasonic therapy is performed on other parts of the patient's skin, the above instructions can also be used for photograph.

In an embodiment, the skin tissue information of the treatment area obtained by the ultrasonic treatment system can be the information manually inputted by the user and displayed on the user interaction interface. For example, the doctor/user selects the skin area to be treated by the options displayed in the user interaction interface; or inputs the relevant skin tissue information by the user interaction interface or the input device connected to the ultrasonic treatment system. The controller in the ultrasonic treatment system divides the target skin into different treatment areas based on the pre-stored information in the memory and the skin tissue information inputted by the doctor/user, and selects the combination mode or individual mode of the linear-type handpiece and the point-type handpiece on the interaction interface, and/or selects the focus depth of the ultrasonic energy and other treatment plans. Specifically, when the skin tissue information obtained by the ultrasonic treatment system is facial skin, the skin tissue information is divided into the treatment area and displayed on the user interaction interface. The treatment area can be specifically divided into the forehead, cheek, periocular region, etc. In addition, the contents displayed on the user interaction interface will be displayed in sequence, including but not limited to: confirmation of skin tissue information, confirmation of treatment area division, and confirmation of treatment plan. Each displayed content needs to be confirmed by the user to avoid errors in skin tissue information obtained by the ultrasonic treatment system.

It should be noted that the user can also set the combined working mode of the treatment handpiece according to the actual situation, continues to execute the steps according to the preset combined working mode, and artificially controls the ultrasonic treatment system to work.

In this embodiment, the ultrasonic treatment system confirms the skin tissue information that needs to be treated and divides it into different treatment areas, and then controls the linear-type handpiece and the point-type handpiece to emit the ultrasonic energy in an individual mode or a combination mode, so that the skin in the treatment area is heated by focused ultrasound, which causes the skin tissue in the skin to shrink and degenerate after being thermally stimulated, thereby achieving the purpose of anti-aging.

It should be understood that the ultrasonic treatment system obtains the skin tissue information of the treatment area and divides it into different treatment areas, and then confirms the treatment plan according to the pre-stored information in the memory. According to different treatment areas, the ultrasonic treatment system will control the linear-type handpiece and the point-type handpiece to emit in the individual mode or combination mode to apply the ultrasonic energy accordingly, so as to achieve the technical effect of targeted treatment.

Figure 3:
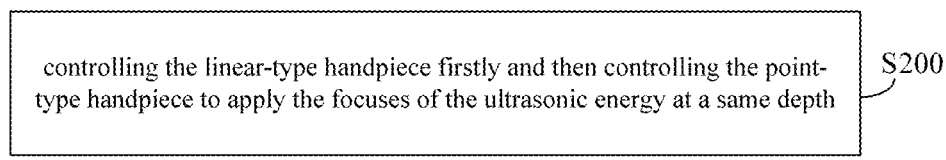
FIG. 3 is a flow chart of a method for controlling an ultrasonic treatment system according to yet another embodiment of the present application.

Therefore, referring to FIG. 3, in an embodiment of the present application, the control method also includes:

Step S200: controlling the linear-type handpiece firstly and then controlling the point-type handpiece to apply the focuses of the ultrasonic energy at a same depth.

In this embodiment, the ultrasonic treatment system obtains the skin tissue information of the treatment area, and determines the treatment depth to be treated according to the pre-stored information in the memory and the skin tissue characteristics of the current treatment area, it will control the linear-type handpiece and the point-type handpiece in sequence to emit ultrasonic focused energy to the treatment depth to ensure the complete coverage of the treatment area of the treatment depth. The ultrasonic treatment system will first control the linear-type handpiece to emit ultrasonic energy to the ultrasonic focus depth, and treat a larger area of the skin in the treatment area through the working characteristics of the linear-type handpiece. After the linear-type handpiece finishes working, the ultrasonic treatment system will control the point-type handpiece again to emit ultrasonic energy to the ultrasonic focus depth, so as to ensure the uniformity and accuracy of the treatment. The point-type handpiece is used to treat a relatively small area of the skin in the treatment area, which makes up for the defect that the linear-type handpiece is not convenient for treating concave areas or convex areas of the facial skin and/or small-scale facial corners.

Figure 4:
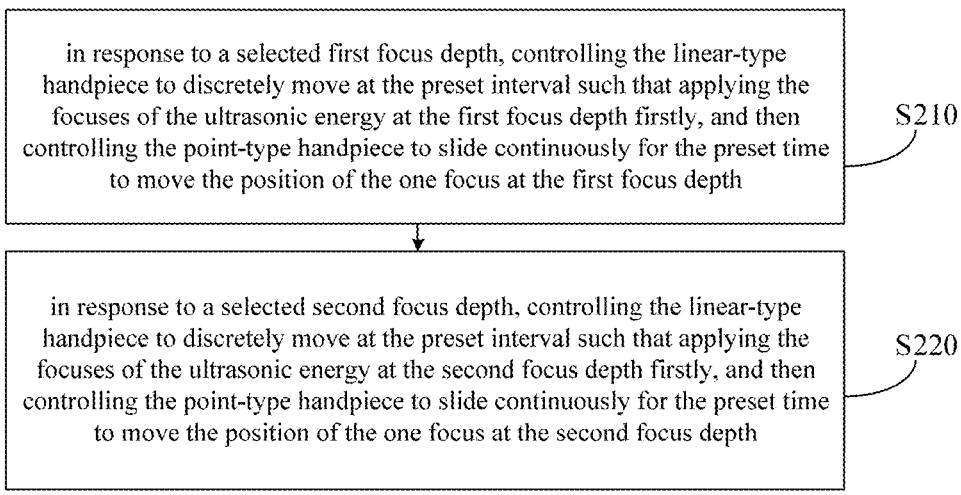
FIG. 4 is a flow chart of a method for controlling an ultrasonic treatment system according to another embodiment of the present application.

Referring to FIG. 4, furthermore, the step of the controlling the linear-type handpiece firstly and then controlling the point-type handpiece to apply the focuses of the ultrasonic energy at the same depth, includes:

Step S210: in response to a selected first focus depth, controlling the linear-type handpiece to discretely move at the preset interval such that applying the focuses of the ultrasonic energy at the first focus depth firstly, and then controlling the point-type handpiece to slide continuously for the preset time to move the position of the one focus at the first focus depth.

Step S220: in response to a selected second focus depth, controlling the linear-type handpiece to discretely move at the preset interval such that applying the focuses of the ultrasonic energy at the second focus depth firstly, and then controlling the point-type handpiece to slide continuously for the preset time to move the position of the one focus at the second focus depth.

It is needs to be understood that in the ultrasonic treatment system, whether it is a linear-type handpiece or a point-type handpiece, the ultrasonic energy emitted by it will produce different therapeutic effects on skin tissues at different skin depths. For example, acting on the SMAS fascia layer, it can cause the fascia to shrink immediately, thus enhancing the suspension function of the ligament fascia, and can significantly lift and tighten the sagging skin; acting on the superficial fascia layer, it can cause the fat fibers to shrink immediately, thus compacting the fat, and improving the aging problems caused by fat accumulation and sagging; acting on the dermis layer, it can cause the elastic fibers of the skin tissue to shrink immediately, thus tightening the skin, and enhancing the immediate tightening effect. The first focus depth and the second focus depth correspond to skin tissues with different skin depths. The linear-type handpiece and the point-type handpiece emit ultrasonic energy at different ultrasonic focus depths, which can be achieved by replacing the ultrasonic therapy tip or using a transducer and a moving mechanism. Specifically, multiple ultrasonic therapy tips are detachably mounted on the linear-type handpiece and the point-type handpiece respectively correspondingly, so that the linear-type handpiece and the point-type handpiece emit the ultrasonic energy at multiple ultrasonic focus depths. The multiple ultrasonic therapic tips can be divided into linear-therapy tips and point-therapy tips. For example, a linear-type handpiece can be equipped with a first linear-therapy tip and a second linear-therapy tip; a point-type handpiece can be equipped with a first point-therapy tip, a second point-therapy tip and a third point-therapy tip; the first linear-therapy tip and the first point-therapy tip mainly act on the subcutaneous 4.5 mm, and the main level of action is the superficial musculoaponeurotic system. The second linear-therapy tip and the second point-therapy tip mainly act on the subcutaneous 3.0 mm, and the main layer of action is the subcutaneous fat layer; while the third point-therapy tip acts on the dermis layer. About 2.0 mm below the epidermis of human skin is the dermis layer; 3.0 mm below the epidermis of human skin is the superficial fascia layer; 4.5 mm below the epidermis of human skin is the fascia layer. The main structural component of the dermis layer is collagen, which is a kind of fibrous protein that contributes to skin strength and elasticity. Collagen decreases with age, leading to changes in the skin's mechanical properties, such as texture and elasticity. Heat treatment of the skin causes thermal contraction of collagen, which occurs due to the heat-sensitive dissociation of collagen molecules, so thermal deformation of collagen often results in a skin tightening effect. The use of the transducer and the moving mechanism is achieved by controlling the moving mechanism so that the moving mechanism drives the transducer to move, thereby realizing that the linear-type handpiece and point-type handpiece emit ultrasonic energy at different ultrasonic focus depths, thus achieving the effect of treating different skin depths.

Figure 5:
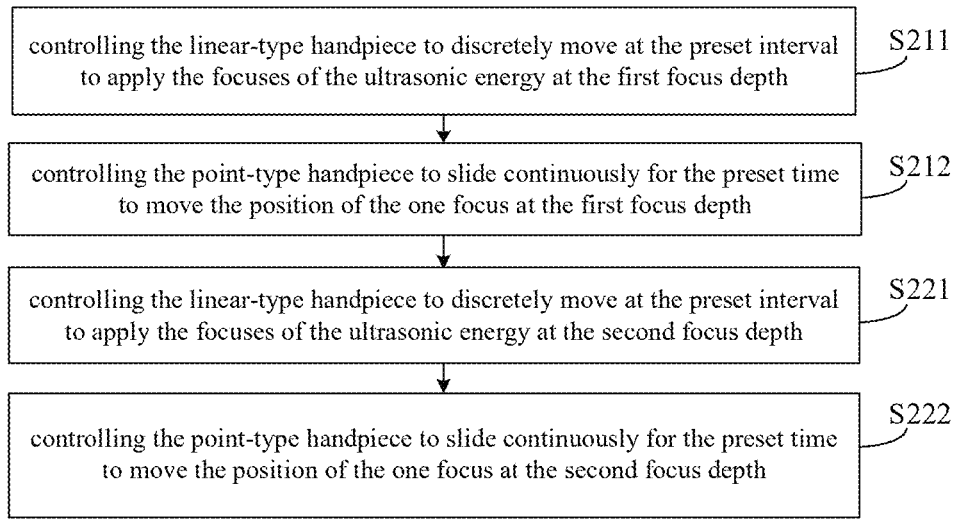
FIG. 5 is a flow chart of a method for controlling an ultrasonic treatment system according to another embodiment of the present application.

In an embodiment, referring to FIG. 5, furthermore, in response to that the first focus depth is greater than the second focus depth, the sequence of controlling the handpieces includes:

Step S211: controlling the linear-type handpiece to discretely move at the preset interval to apply the focuses of the ultrasonic energy at the first focus depth.

Step S212: controlling the point-type handpiece to slide continuously for the preset time to move the position of the one focus at the first focus depth.

Step S221: controlling the linear-type handpiece to discretely move at the preset interval to apply the focuses of the ultrasonic energy at the second focus depth.

Step S222: controlling the point-type handpiece to slide continuously for the preset time to move the position of the one focus at the second focus depth.

It is understandable that the ultrasonic treatment system can control at least one of the linear-type handpiece and the point-type handpiece to apply the focuses of the ultrasonic energy moving from deep to shallow in sequence. Specifically, the ultrasonic treatment system controls the linear-type handpiece to emit the ultrasonic energy at a first focus depth to act on the skin tissue at the first focus depth, and works on the skin surface of the human body by discretely moving at the preset interval, so that the ultrasonic energy acting on the skin tissue presents multiple rows of energy focus areas, thereby achieving the effect of rapid treatment with a larger area. For a narrow area that is not convenient for the linear-type handpiece to treat, the ultrasonic treatment system control the point-type handpiece to act on the same ultrasonic focus depth (that is, the first focus depth) to emit ultrasonic energy, so as to act on the area that is inconvenient to treat or missed by the linear-type handpiece. By controlling the point-type handpiece to sliding continuously in a circular path in a preset time to move a position of the one focus inside the treatment area, the ultrasonic energy acting on the skin tissue is arranged in a circular pattern, thereby achieving a targeted treatment effect covering smaller areas after the larger treatment areas applied by the linear-type handpiece. When the linear-type handpiece and the point-type handpiece have finished working at the first focus depth, the ultrasonic treatment system will control the linear-type handpiece again and emit ultrasonic energy at the second focus depth to act on the skin tissue at the second focus depth, and adopt the method of discretely moving with the same preset interval as that acting on the first focus depth. For the treatment areas that are not convenient for the linear-type handpiece to apply the ultrasonic energy, the ultrasonic treatment system will still control the point-type handpiece to act on the same ultrasonic focus depth (that is, the second focus depth) to emit the ultrasonic energy to act on the treatment areas that are inconvenient to treat or missed by the linear-type handpiece. The point-type handpiece is controlled to work on the skin surface by sliding continuously in a circular path at the same preset time as the second focus depth. Both the linear-type handpiece and the point-type handpiece can change the ultrasonic focus depth by replacing the corresponding therapy tip or adopting and controlling the transducer and the moving mechanism. By further controlling the working mode of the linear-type handpiece and the point-type handpiece, the consistency of the treatment process is effectively guaranteed, thereby ensuring the treatment effect.

In another embodiment, in response to that the first focus depth is greater than the second focus depth, the sequence of controlling the handpieces includes:
controlling the linear-type handpiece to discretely move at the preset interval to apply the focuses of the ultrasonic energy at the second focus depth;
controlling the point-type handpiece to slide continuously for the preset time to move the position of the one focus at the second focus depth;
controlling the linear-type handpiece to discretely move at the preset interval to apply the focuses of the ultrasonic energy at the first focus depth; and
controlling the point-type handpiece to slide continuously for the preset time to move the position of the one focus at the first focus depth.

It is understandable that the ultrasonic treatment system can control the linear-type handpiece and the point-type handpiece to apply the focuses of the ultrasonic energy moving from shallow to deep in sequence. At the same time, the linear-type handpiece and the point-type handpiece are respectively controlled to emit ultrasonic energy successively at the same focus depth; the skin at the same focus depth is treated firstly, and then the skin at other focus depths is treated, thereby ensuring the consistency of the treatment process.

Figure 6:
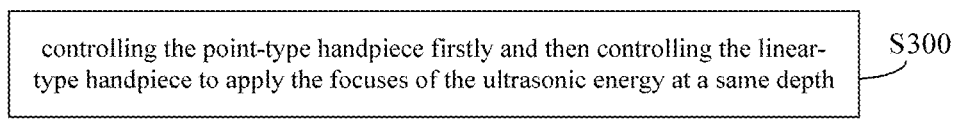
FIG. 6 is a flow chart of a method for controlling an ultrasonic treatment system according to another embodiment of the present application.

Referring to FIG. 6, in an embodiment, the control method also includes:
Step S300: controlling the point-type handpiece firstly and then controlling the linear-type handpiece to apply the focuses of the ultrasonic energy at a same depth.

In this embodiment, the control method is a method parallel to the above method, and the technical effect and technical principle that can be achieved are consistent with the above method.

In summary, in the present application, the ultrasonic treatment system can arbitrarily control at least one of the linear-type handpiece and the point-type handpiece to emit ultrasonic energy. Therefore, it includes three methods: controlling the linear-type handpiece to emit the ultrasonic energy, controlling the point-type handpiece to emit the ultrasonic energy, or controlling the linear-type handpiece and the point-type handpiece in the combination mode to emit the ultrasonic energy in sequence. The combination mode of controlling the linear-type handpiece and the point-type handpiece to emit ultrasonic energy can be divided into two ways: controlling the linear-type handpiece first and then controlling the point-type handpiece, and controlling the point-type handpiece first and then controlling the linear-type handpiece. In addition, according to different treatment needs, the ultrasonic treatment system can also control at least one of the linear-type handpiece and the point-type handpiece to emit ultrasonic energy to multiple focus depths from deep to shallow in sequence or to emit ultrasonic energy to multiple focus depths from shallow to deep in sequence. Furthermore, in actual applications, control scenarios of multiple sequential control combinations or multiple different depth combinations are not excluded. It will be understood that the ultrasonic treatment system includes a variety of control methods, and the variety of control methods will be determined by the skin tissue information of the treatment area. The user can, based on the interactive interface and based on the displayed skin information of the treatment area, input an individual mode or a combination mode of the linear-type handpiece and the point-type handpiece, and treatment depth information, so that the user can control the ultrasonic treatment system to emit ultrasonic energy to the treatment area in a variety of modes.

Figure 7:
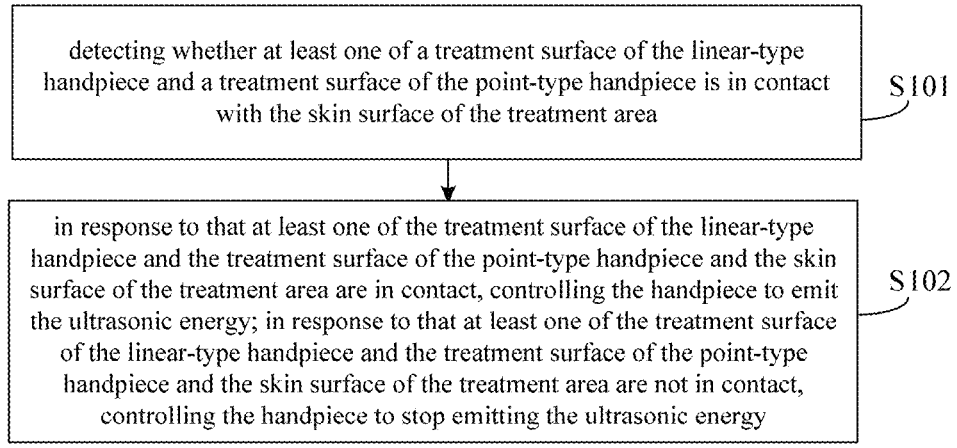
FIG. 7 is a flow chart of a method for controlling an ultrasonic treatment system according to another embodiment of the present application.

Referring to FIG. 7, in an embodiment of the present application, the step S100 of the method for controlling the ultrasonic treatment system includes the following steps:
S101: detecting whether at least one of a treatment surface of the linear-type handpiece and a treatment surface of the point-type handpiece is in contact with the skin surface of the treatment area.
S102: in response to that at least one of the treatment surface of the linear-type handpiece and the treatment surface of the point-type handpiece and the skin surface of the treatment area are in contact, controlling the handpiece to emit the ultrasonic energy; in response to that at least one of the treatment surface of the linear-type handpiece and the treatment surface of the point-type handpiece and the skin surface of the treatment area are not in contact, controlling the handpiece to stop emitting the ultrasonic energy.

The treatment surface of the handpiece can be provided with a detection sensor configured for detecting contact statuses between the treatment surface of the linear-type handpiece or the point-type handpiece and a skin surface, and the detection sensor includes at least one of a pressure sensor, a capacitive sensor and a light sensor. Taking the pressure sensor as an example, the pressure after whether the treatment surface of the handpiece contacts the skin surface is detected. When it is detected that the pressure value or the pressure change value is greater than a certain threshold, it means that the treatment surface of the handpiece is in contact with the skin surface of the treatment area, and the contact state signal is fed back to the controller of the treatment system, and the controller controls the handpiece to emit the ultrasonic energy. The handpiece includes at least one of a linear-type handpiece and a point-type handpiece, that is, the controller controls at least one of the linear-type handpiece and the point-type handpiece to emit the ultrasonic energy. The pressure sensors arranged on the treatment surface can be multiple, evenly and symmetrically distributed on the treatment surface. During treatment, the treatment surface receives continuous pressure from the skin surface of the treatment area, and when the treatment surface is departing from the skin surface, the voltage signal changes. According to the changed voltage signal, it can be determined whether the treatment surface departs from the skin surface, and further controls whether the handpiece stops outputting ultrasonic energy. Taking the capacitive proximity sensor as an example, the capacitive proximity sensor is an electrostatic capacitance proximity switch with an electrode as the detection end, which is composed of a high-frequency oscillation circuit, a detection circuit, an amplification circuit, a shaping circuit and an output circuit; there is a certain capacitance between the detection electrode set at the treatment surface and the skin surface, which becomes a component of the oscillation circuit. When the skin surface is closer to the detection electrode, since the detection electrode is charged with voltage, the detection electrode will be induced by electrostatics and produce polarization. The closer the skin surface is to the detection electrode, the more induced charge on the detection electrode. When the capacitive sensor senses that the distance between the treatment surface and the skin surface of the treatment area gradually decreases to 0, the induction signal is fed back to the controller to control the ultrasonic treatment apparatus to emit ultrasonic energy. On the contrary, when the capacitive sensor senses that the distance between the treatment surface and the skin surface gradually increases from 0, the induction signal is transmitted to the controller, and the ultrasonic treatment apparatus stops outputting ultrasonic energy to avoid the loss of focused ultrasonic energy.

Figure 8:
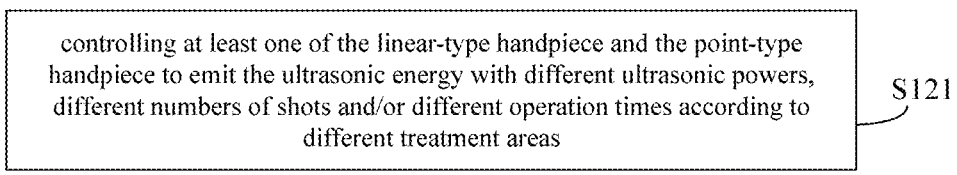
FIG. 8 is a flow chart of a method for controlling an ultrasonic treatment system according to another embodiment of the present application.

Referring to FIG. 8, in an embodiment of the present application, based on skin information of the treatment area, the controlling at least one of the linear-type handpiece and the point-type handpiece to apply the ultrasonic energy inside further includes:

Step S121: controlling at least one of the linear-type handpiece and the point-type handpiece to emit the ultrasonic energy with different ultrasonic powers, different numbers of shots and/or different operation times according to different treatment areas.

In this embodiment, in order to make the treatment of the linear-type handpiece and the point-type handpiece more precisely, the human skin needs to be divided into multiple treatment areas. Taking the face as an example, the ultrasonic treatment apparatus divides the face into normal area, nerve sensitive area, sunken area and ligament strengthening area by the obtained skin tissue information of the face. The normal area is the area that can be directly treated by controlling the linear-type handpiece, and the point-type handpiece can also be controlled for treatment. The nerve sensitive areas from top to bottom are: supraorbital foramen (generally located at the junction of the middle and inner ⅓ of the upper orbital margin, about 2.5 cm from the midline of the face), infraorbital foramen (about 0.5 cm below the midpoint of the lower orbital margin), superficial area of the trigeminal nerve (1.5 cm to 2 cm in front of the tragus), and mental foramen (usually located below the root of the second mandibular premolar, the midpoint of the line connecting the upper and lower edges of the mandibular body, about 2.5 cm from the midline). The sunken areas include cheek depressions, temple depressions, and other sunken parts of the face. The ultrasonic treatment system will display on the user interaction interface the nerve-sensitive areas that the user needs to avoid when emitting ultrasonic energy using the linear-type handpiece and point-type handpiece with a specific focus depth, so as to avoid the problem that the treatment of nerve-sensitive areas may cause pain to the patient due to the high output power of the linear-type handpiece and point-type handpiece. For sunken areas and areas that are judged to be unsuitable for treatment, the use of multi-depth treatment control methods can be reduced or cancelled according to actual conditions. For the ligament strengthening area, the ultrasonic therapy tip of the corresponding depth can be controlled to extend the sliding operation, each area can be extended by 30 s to 1 min according to the situation, and the extended area operation time is included in the total operation time. For example, the zygomatic arch ligament site can control at least one of the linear-type handpiece and the point-type handpiece to perform enhanced treatment with the second focus depth. Other ligament sites can control at least one of the linear-type handpiece and the point-type handpiece to perform enhanced treatment with the first focus depth or the second focus depth. The second focus depth enhanced area above the eyebrow is divided into: the line connecting the lower edge of the nose wing on the same side and the middle point of the pupil extends to the edge of the hairline on the same side, and the line connecting the lower edge of the nose wing on the same side and the outer canthus of the eye extends to the edge of the hairline on the same side, and the area with a height of 2 cm~3 cm is the second focus depth enhanced area above the eyebrow. In this way, at least one of the linear-type handpiece and the point-type handpiece is controlled to perform treatment with different ultrasonic focus depths for different areas, thereby ensuring the maximum treatment effect. Different ultrasonic focus depths can be achieved by replacing the therapy tip or using a transducer and a moving mechanism, and controlled by an ultrasonic treatment system to output ultrasonic energy with different ultrasonic powers, different numbers of shots and/or different operation times.

Furthermore, referring to FIG. 9, the controlling at least one of the linear-type handpiece and the point-type handpiece to emit the ultrasonic energy with different ultrasonic powers, different numbers of shots and/or different operation times according to different treatment areas further includes:

Step S122: controlling at least one of the linear-type handpiece and the point-type handpiece to output the ultrasonic energy with an adjusted ultrasonic power, an adjusted number of shots and/or an adjusted operation time based on detected temperature data of the treatment area, detected acoustic impedance data of the treatment area, or a detected movement speed of the handpiece.

In this embodiment, the sensor component on the ultrasonic therapy tip or the ultrasonic handpiece unit includes a temperature sensor, a speed sensor or a detection sensor, which detects the skin temperature of the treatment area or the movement speed of the handpiece or the contact state between the handpiece and the skin surface, or detects the acoustic impedance data of the treatment area in real time, thereby controlling at least one of the linear-type handpiece and the point-type handpiece to output ultrasonic energy with adjusted ultrasonic power, number of shots and/or operation time. In an embodiment, taking the temperature sensor as an example, when it is detected that the temperature of the surface of the ultrasonic therapy tip is higher than the preset temperature value, the transducer is controlled to stop outputting ultrasonic energy; when it is detected that the temperature of the surface of the ultrasonic therapy tip is lower than the preset temperature value, an operation instruction signal is output to control the transducer to continue to output ultrasonic energy or to continue to output ultrasonic energy with increased ultrasonic power. In this embodiment, the temperature sensor is used to detect the temperature of the skin surface. When the temperature of the skin surface is too high, at that time, the ultrasonic therapy transducer stops outputting ultrasonic energy to the subcutaneous tissue. In another embodiment, taking the speed sensor as an example, when it is detected that the movement speed of the handpiece is high, the alarm sounds to prompt the operator to slow down the movement speed of the handpiece. When it is detected that the movement speed is low, it is determined that the control method for outputting ultrasonic energy is small enough or the control method for outputting ultrasonic energy stops moving, and the ultrasonic therapy transducer stops outputting ultrasonic energy to the subcutaneous tissue to avoid the possibility of outputting ultrasonic energy multiple times at the same position on the skin, thus reducing the risk of scalding the skin. During operation, according to the movement speed detected by the speed sensor, the ultrasonic treatment system controls the output ultrasonic energy of at least one of the linear-type handpiece and the point-type handpiece, the output ultrasonic energy is different for movement speeds in different intervals, that is, the ultrasonic power, number of shots and/or operation time of at least one of the linear-type handpiece and the point-type handpiece are controlled to cause the ultrasonic therapy to achieve the expected therapeutic effect. Similarly, taking the ultrasonic treatment system detecting the acoustic impedance of skin tissue in the treatment area as an example, the ultrasonic treatment system can detect the acoustic impedance value of the treatment area in real time, and output the corresponding ultrasonic power according to the real-time detected acoustic impedance value according to the one-to-one corresponding relationship between the pre-stored acoustic impedance data of different skins and the ultrasonic power; or, when the real-time detected acoustic impedance value exceeds the range of the pre-stored acoustic impedance data, the skin contact of the treatment surface is abnormal, and the control handpiece does not output energy or stops outputting the ultrasonic energy.

Referring to FIG. 10, in an embodiment of the present application, an ultrasonic treatment system includes a controller, a memory, a linear-type handpiece and a point-type handpiece.

The memory stores a control program of the ultrasonic treatment system, when the control program is executed by the controller, the method for controlling the ultrasonic treatment system described in any one of the above items is implemented.

The linear-type handpiece is configured to apply multiple focuses of ultrasonic energy in line at one shot, being capable of discretely moving at a preset interval along a skin surface of the treatment area, and the point-type handpiece is configured to apply one focus of ultrasonic energy at one shot, being capable of sliding continuously for a preset time along the skin surface of the treatment area to move a position of the one focus inside the treatment area.

In this embodiment, the controller may be a Digital Signal Processor (DSP for short), a Programmable Logic Device (PLD for short), a Field Programmable Gate Array (FPGA for short), a microprocessor, an MCU (Microcontroller Unit) or other electronic components. The memory may be a memory of the type of E2PROM (Electrically-Erasable Programmable Read-Only Memory) or DDR3 (Double-Data-Rate Three), etc., for storing the ultrasonic therapy system control program. In this way, the controller can implement the control method for the ultrasonic therapy system in the above embodiment by executing the ultrasonic therapy system control program in the memory. The linear-type handpiece does not move during treatment, and the ultrasonic window is close to the skin of the treatment area. The transducer in the treatment tip is driven by the motor in the handpiece to move, and multiple ultrasonic energy focuses are sequentially generated in the treatment area, and the focuses are arranged in a straight line. The energy of the hot zone formed by the treatment is concentrated at the center point, the surrounding energy is low, and the center energy is high. During treatment, the operator moves the handpiece of the point-type handpiece and keeps the ultrasonic window sliding against the skin, the ultrasonic energy is output in a pulsed manner. By continuously moving the point-type handpiece, the position of ultrasonic energy output is controlled, so as to achieve the therapeutic effect. The ultrasonic therapy transducer provided on the ultrasonic therapy tip outputs focused ultrasonic energy, which is reflected as a thermal effect on the tissue, and the heat diffuses from the focal point to the surrounding area to form a hot zone/heat diffusion zone.

Figure 11:
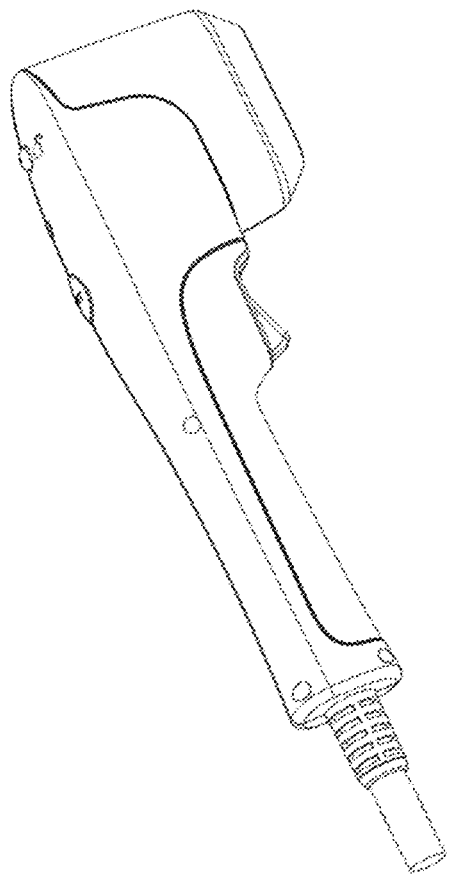
FIG. 11 is a structural schematic view of a linear-type handpiece.
Figure 12:
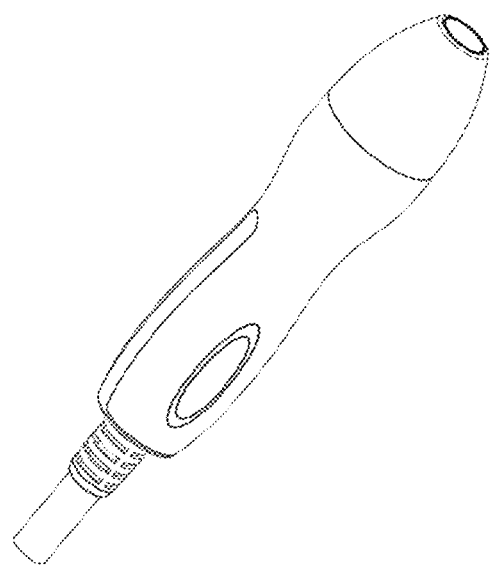
FIG. 12 is a structural schematic view of a point-type handpiece.

In an embodiment, referring to FIG. 11 and FIG. 12, the system further includes multiple ultrasonic tips detachably mounted on the linear-type handpiece and the point-type handpiece respectively correspondingly, the multiple ultrasonic tips are capable of generating multiple focuses in different depths discretely, such that, after mounted with the ultrasonic tips, the linear-type handpiece and the point-type handpiece are capable of applying the multiple focuses of the ultrasonic energy at different depths in the treatment area.

Furthermore, the linear-type handpiece and the point-type handpiece can change the focus depth that the linear-type handpiece and the point-type handpiece each keep replacing different ultrasonic therapy tips, thereby achieving a multi-layer treatment effect in the treatment area, so that the ultrasonic therapy does not just stay at a certain skin depth layer.

In an embodiment, the linear-type handpiece and the point-type handpiece each include a transducer and a moving mechanism, the moving mechanism is configured to drive the transducer to move, such that the linear-type handpiece and the point-type handpiece are capable of applying the focuses of the ultrasonic energy continuously generated by the moveable transducer at multiple depths.

In this embodiment, the linear-type handpiece and the point-type handpiece can also control the transducer to move continuously along the depth direction of the skin, by controlling the moving mechanism, thereby changing the focus depth that can be achieved by emitting ultrasonic energy emitted from the linear-type handpiece and the point-type handpiece.

In an embodiment, the linear-type handpiece and the point-type handpiece each further includes a detection sensor configured for detecting contact statuses between the treatment surface of the linear-type handpiece or the point-type handpiece and a skin surface.

The detection sensor includes at least one of a pressure sensor, a capacitive sensor and a light sensor.

In this embodiment, the linear-type handpiece and the point-type handpiece can determine that the treatment surface of the handpiece is in contact with the skin surface of the treatment area by the detection sensor provided at the treatment surface. The detection sensor feeds back the detected contact state signal to the controller in the ultrasonic treatment system, so that the controller controls the handpiece to emit ultrasonic energy according to the signal.

In an embodiment, the ultrasonic treatment system further includes:

a user interface configured for displaying skin information of the treatment area, receiving an individual mode or a combination mode of the linear-type handpiece and the point-type handpiece inputted by an user, and/or a treatment depth information, and sending acquired combination mode information of the linear-type handpiece and the point-type handpiece, and/or the treatment depth information to the controller.

It can be understood that the ultrasonic treatment system can also include a user interaction interface. The user interaction interface can be implemented by a touch screen. The ultrasonic treatment system can display the acquired individual mode information or combination mode information of the linear-type handpiece and the point-type handpiece of the treatment area and/or the treatment depth information on the touch screen, and also acquire and display the target position skin tissue information and the treatment depth information by the touch screen, and send the information to the controller, so that the ultrasonic treatment system control program stored in the tool memory of the controller executes the method for controlling the ultrasonic treatment system. In addition, the user interaction interface will also display the control process of the controller executing the method for controlling the ultrasonic treatment system, and display the data detected by the sensor component, so as to timely remind the user, and ensure the correct execution of the ultrasonic therapeutic work.

The present application further proposes an ultrasonic treatment apparatus, which includes the ultrasonic treatment system as described above. The specific structure of the ultrasonic treatment system refers to the above embodiment. Since the ultrasonic treatment system adopts all the technical solutions of all the above embodiments, it has at least all the beneficial effects brought by the technical solutions of the above embodiments, which will not be described again here.

The above are only some embodiments of the present application, and are not intended to limit the scope of the present application. Under the concept of the present application, any equivalent structure transformation made by utilizing the description and accompanying drawings of the present application, or directly or indirectly applied in other related technical fields, is included within the scope of the present application.

What is claimed is:

1. A method for controlling an ultrasonic treatment system applying focuses with uniform coverage of a treatment area, comprising:

controlling a linear-type handpiece firstly and then controlling a point-type handpiece to apply the focuses of the ultrasonic energy at a same depth inside the treatment area, or controlling the point-type handpiece firstly and then controlling the linear-type handpiece to apply the focuses of the ultrasonic energy at a same depth inside the treatment area, or controlling at least one of the linear-type handpiece and the point-type handpiece to apply the focuses of the ultrasonic energy at different depths inside the treatment area;

wherein the linear-type handpiece is configured to apply multiple simultaneous focuses in line at one shot, being capable of discretely moving at a preset interval along a skin surface of the treatment area; and the point-type handpiece is configured to apply one focus of the ultrasonic energy at one shot, being capable of sliding continuously for a preset time along the skin surface of the treatment area to move a position of the one focus inside the treatment area.

2. The method for controlling the ultrasonic treatment system according to claim 1, wherein before the controlling at least one of the linear-type handpiece and the point-type handpiece to apply the ultrasonic energy inside the treatment area, the method further comprises:

obtaining and displaying skin tissue information of the treatment area; and classifying the treatment area based on the skin tissue information; wherein the treatment area comprises one or more of a forehead, a cheek, a mandible, a periocular region, a neck, and an abdomen.

3. The method for controlling the ultrasonic treatment system according to claim 2, wherein based on skin information of the treatment area, the controlling at least one of the linear-type handpiece and the point-type handpiece to apply the ultrasonic energy inside further comprises:

controlling at least one of the linear-type handpiece and the point-type handpiece to emit the ultrasonic energy with different ultrasonic powers, different numbers of shots and/or different operation times according to different treatment areas.

4. The method for controlling the ultrasonic treatment system according to claim 3, wherein the controlling at least one of the linear-type handpiece and the point-type handpiece to emit the ultrasonic energy with different ultrasonic powers, different numbers of shots and/or different operation times according to the different treatment areas further comprises:

controlling at least one of the linear-type handpiece and the point-type handpiece to output the ultrasonic energy with an adjusted ultrasonic power, an adjusted number of shots and/or an adjusted operation time based on detected temperature data of the treatment area, detected acoustic impedance data of the treatment area, or a detected movement speed of the handpiece.

5. The method for controlling the ultrasonic treatment system according to claim 1, wherein the step of controlling at least one of the linear-type handpiece and the point-type handpiece to apply the focuses of the ultrasonic energy at different depths comprises:

controlling at least one of the linear-type handpiece and the point-type handpiece to apply the focuses of the ultrasonic energy continuously or discretely changed from shallow to deep, or from deep to shallow under the skin surface.

6. The method for controlling the ultrasonic treatment system according to claim 1, wherein the controlling the linear-type handpiece firstly and then controlling the point-type handpiece to apply the focuses of the ultrasonic energy at the same depth comprises:

in response to a selected first focus depth, controlling the linear-type handpiece to discretely move at the preset interval to cause that applying the focuses of the ultrasonic energy at the first focus depth firstly, and then controlling the point-type handpiece to slide continuously for the preset time to move the position of the one focus at the first focus depth; and in response to a selected second focus depth, controlling the linear-type handpiece to discretely move at the preset interval to cause that applying the focuses of the ultrasonic energy at the second focus depth firstly, and then controlling the point-type handpiece to slide continuously for the preset time to move the position of the one focus at the first focus depth.

7. The method for controlling the ultrasonic treatment system according to claim 6, wherein in response to that the first focus depth is greater than the second focus depth, a sequence of controlling the handpieces comprises:
controlling the linear-type handpiece to discretely move at the preset interval to apply the multiple simultaneous focuses of the ultrasonic energy at the first focus depth;
controlling the point-type handpiece to slide continuously for the preset time to move the position of the one focus at the first focus depth;
controlling the linear-type handpiece to discretely move at the preset interval to apply the multiple simultaneous focuses of the ultrasonic energy at the second focus depth; and
controlling the point-type handpiece to slide continuously for the preset time to move the position of the one focus at the second focus depth.

8. The method for controlling the ultrasonic treatment system according to claim 6, wherein in response to that the first focus depth is greater than the second focus depth, a sequence of controlling the handpieces comprises:
controlling the linear-type handpiece to discretely move at the preset interval to apply the multiple simultaneous focuses of the ultrasonic energy at the second focus depth;
controlling the point-type handpiece to slide continuously for the preset time to move the position of the one focus at the second focus depth;
controlling the linear-type handpiece to discretely move at the preset interval to apply the multiple simultaneous focuses of the ultrasonic energy at the first focus depth; and
controlling the point-type handpiece to slide continuously for the preset time to move the position of the one focus at the first focus depth.

9. The method for controlling the ultrasonic treatment system according to claim 1, wherein the controlling at least one of the linear-type handpiece and the point-type handpiece to apply the ultrasonic energy inside the treatment area further comprises:
detecting whether at least one of a treatment surface of the linear-type handpiece and a treatment surface of the point-type handpiece is in contact with the skin surface of the treatment area; and
in response to that at least one of the treatment surface of the linear-type handpiece and the treatment surface of the point-type handpiece and the skin surface of the treatment area are in contact, controlling the handpiece to emit the ultrasonic energy; in response to that at least one of the treatment surface of the linear-type handpiece and the treatment surface of the point-type handpiece and the skin surface of the treatment area are not in contact, controlling the handpiece to stop emitting the ultrasonic energy.

10. An ultrasonic treatment system applying focuses with uniform coverage of a treatment area, comprising:
a controller;
a memory, storing a control program of the ultrasonic treatment system, wherein when the control program is executed by the controller, the method for controlling the ultrasonic treatment system according to claim 1 is implemented;
a linear-type handpiece, configured to apply multiple simultaneous focuses of ultrasonic energy in line at one shot, being capable of discretely moving at a preset interval along a skin surface of a treatment area; and
a point-type handpiece, configured to apply one focus of ultrasonic energy at one shot, being capable of sliding continuously for a preset time along the skin surface of the treatment area to move a position of the one focus inside the treatment area.

11. The ultrasonic treatment system according to claim 10, further comprising:
multiple ultrasonic therapy tips, detachably mounted on the linear-type handpiece and the point-type handpiece respectively correspondingly, such that the linear-type handpiece and the point-type handpiece are capable of applying the multiple simultaneous focuses of the ultrasonic energy at multiple depths discretely.

12. The ultrasonic treatment system according to claim 10, wherein each of the linear-type handpiece and the point-type handpiece comprise a transducer and a moving mechanism, the moving mechanism is configured to drive the transducer to move, such that the linear-type handpiece and the point-type handpiece are capable of applying the multiple simultaneous focuses of the ultrasonic energy generated by the moveable transducer at multiple depths continuously.

13. The ultrasonic treatment system according to claim 10, wherein the linear-type handpiece and the point-type handpiece further comprise a detection sensor configured for detecting contact statuses between a treatment surface of the linear-type handpiece or a point-type handpiece and a skin surface; and
wherein the detection sensor comprises at least one of a pressure sensor, a capacitive sensor and a light sensor.

14. The ultrasonic treatment system according to claim 10, further comprising:
a user interaction interface configured for displaying skin information of the treatment area, receiving an individual mode or a combination mode of the linear-type handpiece and the point-type handpiece inputted by an user, and/or a treatment depth information, and sending acquired combination mode information of the linear-type handpiece and the point-type handpiece, and/or the treatment depth information to the controller.

15. An ultrasonic treatment apparatus applying focuses with uniform coverage of a treatment area, comprising the ultrasonic treatment system according to claim 10.

* * * * *